3,532,400
SEALED RADIAL AND THRUST BEARING
ASSEMBLY
Carl F. Benson, Torrington, and James W. Rollins,
Winsted, Conn., assignors to The Torrington Company,
Torrington, Conn., a corporation of Maine
Filed Dec. 3, 1968, Ser. No. 780,845
Int. Cl. F16c 19/04, 13/00
U.S. Cl. 308—174                                    9 Claims

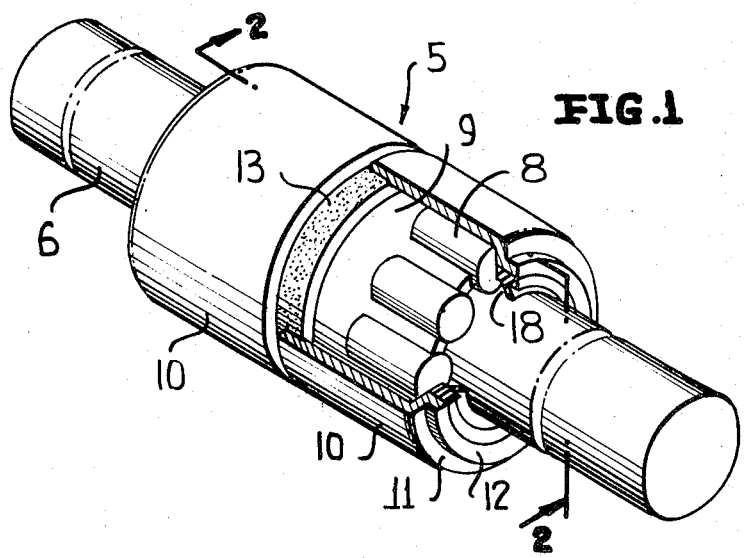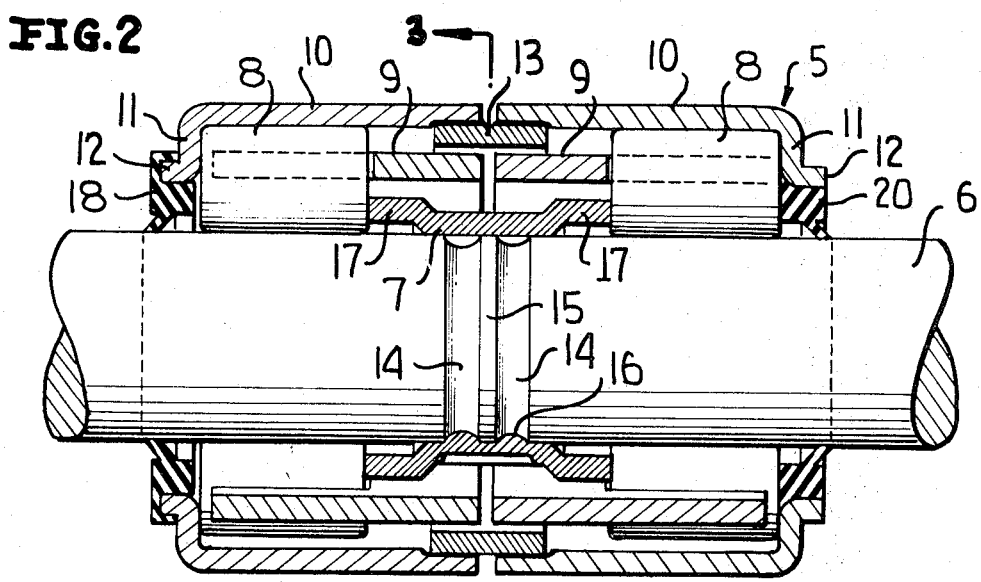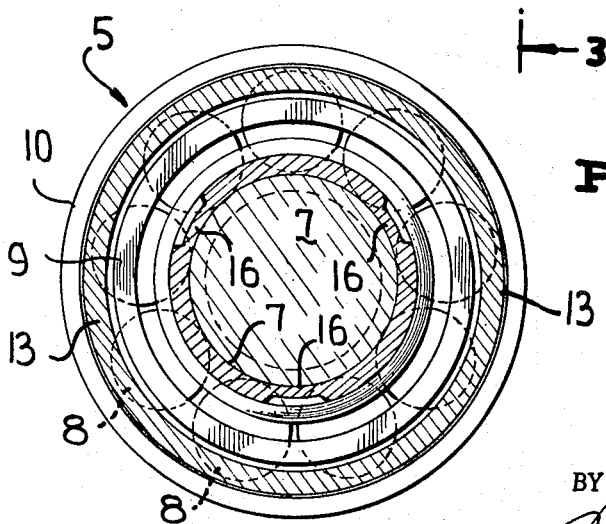
INVENTORS
CARL F. BENSON &
JAMES W. ROLLINS
BY Mason, Porter, Diller & Brown
ATTORNEYS United States Patent Office 3,532,400
Patented Oct. 6, 1970

ABSTRACT OF THE DISCLOSURE

This disclosure relates to a combined radial and thrust bearing assembly which includes a shaft having a center spacer secured thereto and wherein a row of rollers engage the shaft on opposite sides of the center spacer. The bearing assembly also includes a pair of outer races defined by cup-shaped members which are secured together in opposed end-to-end relation with each cup-shaped member having an end flange which engages ends of respective rollers and absorbs axial thrust when the rollers are in contact with the center spacer. The axial thrust of the shaft is taken by the end flanges adjacent the outer race surfaces while the center spacer engages the rollers adjacent to, but radially inwardly of the pitch circle of the rollers whereby a minimum rubbing speed is encountered.

---

This invention relates in general to new and useful improvements in combined radial and thrust bearing assemblies, and more particularly to the sealed permanently assembled unit.

A primary feature of this invention is to provide a combined radial and thrust bearing assembly which is of a construction to permit a maximum shaft diameter for a given outside diameter of the bearing assembly.

Another feature of this invention is to provide a combined radial and thrust bearing assembly wherein a low rubbing speed is provided between the rollers and axially engaged surfaces so as to both hold frictional losses and wear to a minimum.

Another feature of this invention is to provide a novel radial and thrust bearing assembly which is of an extremely simple construction whereby it may be readily assembled in a economical manner, and at the same time the desired axial internal fit of the bearing assembly may be obtained.

A further object of this invention is to provide a novel sealed radial and thrust bearing assembly which, although it is particularly adapted to be provided with a small diameter shaft, is of a construction which is not restricted in size.

With the above and other objects in view that will hereinafter appear, the nature of the invention will be more clearly understood by reference to the following detailed description, the appended claims and the several views illustrated in the accompanying drawing:

In the drawing:

FIG. 1 is a perspective view of a sealed radial and thrust bearing assembly formed in accordance with this invention, a portion of the assembly being broken away and shown in section in order to illustrate the internal constructional details thereof.

FIG. 2 is an enlarged fragmentary longitudinal sectional view taken along the line 2—2 of FIG. 1 and shows more specifically the details of the bearing assembly.

FIG. 3 is a transverse sectional view taken along the line 3—3 of FIG. 2 and further shows the details of the bearing assembly.

Referring now to the drawing in detail, it will be seen that the bearing assembly, which is the subject of this invention, is generally identified by the numeral 5. The bearing assembly 5 basically includes a shaft 6, which is illustrated as being of a double ended construction, but may be of a single ended construction if it is so desired.

The shaft 6 is provided with a center spacer 7 which is fixedly secured thereto in a manner to be described in detail hereinafter. On each side of the center spacer 7 there is a row of rollers 8 with the rollers 8 being preferably retained in circumferentially spaced relation by means of finger cages 9 arranged in back-to-back, but normally spaced, relation. The finger cages 9 are illustrated as engaging the rollers 8 radially outwardly of the pitch circle thereof.

The bearing assembly 5 also includes a pair of cup-shaped outer members 10 which have their open ends opening towards one another. The outer members 10 are provided with end flanges 11 which, in turn, terminate in annular portions 12.

It is to be noted that the rollers 8 have their opposed ends engaging the opposite ends of the center spacer 7. At the same time, the remote ends of the rollers 8 are in engagement with the end flanges 11 of the outer members 10. The outer members 10 are retained in this relationship relative to the rollers 8 and the center spacer 7 by means of a securing ring 13. The inner surfaces of the outer members 10 are preferably circumferentially recessed adjacent the opposed ends thereof. The securing ring 13 is seated in the recessed portions of the outer members 10 and is suitably secured thereto, such as by brazing, welding or other bonding means. It is to be understood that the outer members 10 are axially positioned relative to one another prior to the binding thereof to the securing ring 13.

It is also pointed out at this time that the external surface of the shaft 6, at opposite ends of the center spacer 7, functions as inner bearing races for the rollers 8. At the same time, the inner surfaces of the outer members 10 function as outer bearing races for the rollers 8. Thus, when the outer members 10 are properly fixed within a machine element, the shaft 6 is rigidly supported for rotation by the axially spaced rollers 8 and at the same time is supported against axial movement by the engagement of the center spacer 7 with the rollers 8 and in engagement with the rollers 8 with the end flanges 11.

In addition to the novel manner in which the outer members 10 are secured together in a predetermined condition, an important feature of the bearing assembly is the specific securement of the center spacer 7 to the shaft 6. Prior to the assembly of the center spacer 7 with the shaft 6, the shaft 6 is provided with a pair of annular grooves 14 which are axially spaced so as to leave therebetween the rib 15. The external surface of the rib 15 is of the same diameter as the external surface as the shaft 6 so that the center spacer 7 may be readily slid over the shaft 6 into the position illustrated in FIG. 2.

The center spacer 7 is permanently and rigidly attached to the shaft 6 by means of a plurality of circumferentially spaced spot welds 16. The spot welds 16 are relatively wide and when formed, not only result in the welding of the center spacer 7 to the rib 15, but also results in the flow of metal into the grooves 14 and the bonding of the flowed metal to the shaft 6 within the grooves 14 to aid in the prevention of axial movement of the shaft 6. Thus, the connection between the shaft 6 and the center spacer 7 is able to absorb the axial thrust applied thereagainst.

It is to be noted that the center spacer 7 has end portions 17 which are radially outwardly offset so as to be of a greater diameter than the central portion thereof.

The radial offset of the end portions 17 is such so as to provide for engagement of the end portions 17 with the rollers 8 at points adjacent to, but radially inwardly offset from the pitch circle of the rollers 8. At this time, it is pointed out that in the past it had been thought that it would be highly desirable to have the engagement of the axial thrust members with the rollers along the pitch circles thereof. However, such bearing assemblies have shown early failures. On the other hand, by moving the contact between the rollers 8 and the center spacer 7 radially inwardly a certain amount, but at the same time spacing the contact radially outwardly of the inner race defined by the outer surface of the shaft 6, the assembly is able to carry the axial thrust imposed thereon while at the same time holding the rubbing speed between the rollers 8 and the center spacer 7 to a minimum.

It is also to be noted that the rollers 8 engage the end flanges 11 adjacent the race surfaces of the outer members 10. By so engaging the rollers 8, the rubbing speed of the outer thrust surfaces is also held to a minimum.

Attention is also directed to the fact that the bearing assembly 5 may be readily sealed by providing suitable seals on the annular portions 12. The seals may be of varied designs, as indicated by the different seals 18 and 20 at the opposite ends of the bearing assembly 5. It is to be noted that the seals 18 and 20 are fixedly carried by the respective outer members 10 and are in rubbing contact with the outer surfaces of the shaft 6.

At this time, it is pointed out that the bearing assembly 5 was initially provided to be utilized as a bearing assembly for internal combustion engine water pumps. Owing to the increased loads placed on accessory drive belts of internal combustion engines utilized in automotive vehicles, the conventional type water pump bearing with its limited capacity failed quickly. The construction of the bearing assembly 5 is such that while it will fit in the same bore as the previous bearing assembly, the roller and shaft diameters may be proportioned for maximum load capacity.

Although the above described bearing assemblies do function satisfactorily in water pumps, it has been found that the same type of construction functions equally as well in larger diameter bearing assemblies. Accordingly, no attempt has been made hereto to define the specific sizes of the components of the bearing assembly or to limit the bearing assembly to any specific type of construction. However, it is to be understood that when the bearing assembly is of a relatively small size, the outer members 10 may beneficially be in the form of drawn sheet metal cups.

Although only a preferred embodiment of the invention has been specifically illustrated and described here, it is to be understood that minor variations may be made in the bearing assembly without departing from the spirit of the invention as defined by the appended claims.

We claim:
1. A combined radial and thrust bearing and shaft assembly comprising a shaft, a separate spacer member secure to said shaft and having oppositely facing thrust surfaces radially spaced from said shaft, said shaft having inner race defining portions at opposite ends of said spacer member, roller assemblies engaging said inner race portions, cup-shaped outer race members telescoped over said roller assemblies, said shaft projecting through end flanges of said race members with said end flanges engaging ends of rollers of said roller assemblies and urging said rollers into contact with said thrust surfaces whereby said thrust surfaces minimize the sliding contact between said rollers and said thrust surfaces, and means securing said race members together in a predetermined relationship.

2. The bearing and shaft assembly of claim 1 wherein said means securing said race members together is disposed within said race members.

3. The bearing and shaft assembly of claim 1 wherein said means securing said race members together is a ring disposed within said race members.

4. The bearing and shaft assembly of claim 1 wherein said means securing said race members together is a ring disposed within said race members, said ring being permanently bonded to said race members in sealed relation therewith.

5. The bearing and shaft assembly of claim 1 wherein said means securing said race members together is a ring disposed within said race members, said ring being permanently bonded to said race members in sealed relation therewith, with fit of said rollers being predetermined axially.

6. The bearing and shaft assembly of claim 1 wherein separate spacer member is a ring.

7. The bearing and shaft assembly of claim 1 wherein said separate spacer member is a ring, said shaft having an annular rib and said ring being welded to said rib.

8. The bearing and shaft assembly of claim 1 wherein said separate spacer member is a ring, said shaft having an annular rib, with annular grooves on opposite sides thereof, and said ring being welded to said rib with welded portions of said ring being deformed into said grooves.

9. The bearing and shaft assembly of claim 1 wherein said end flanges carry seals engaging said shaft and sealing the interior of said assembly.

References Cited

FOREIGN PATENTS 1,066,814 12/1957 Germany.
1,277,129 10/1961 France.
610,711 6/1926 France.

FRED C. MATTERN, JR., Primary Examiner

U.S. Cl. X.R.
308—212